United States Patent [19]

Hiroya et al.

[11] Patent Number: 5,751,957

[45] Date of Patent: May 12, 1998

[54] COMMUNICATION SERVICE SYSTEM EMPLOYING TRANSLATION RULES FOR COMMUNICATING DATA IN DIFFERENT LANGUAGES ALONG A NETWORK

[75] Inventors: Masaaki Hiroya; Koichi Sano, both of Yokohama, Japan

[73] Assignee: Hitachi, Ltd., Tokyo, Japan

[21] Appl. No.: 709,866

[22] Filed: Sep. 10, 1996

[30] Foreign Application Priority Data

Sep. 12, 1995 [JP] Japan .................... 7-233689

[51] Int. Cl.⁶ .................................. G06F 17/28
[52] U.S. Cl. ............... 395/200.33; 395/500; 395/752; 395/758
[58] Field of Search ................. 395/707, 610, 395/752, 758, 500, 200.31, 200.32, 200.33

[56] References Cited

U.S. PATENT DOCUMENTS

| | | | |
|---|---|---|---|
| 4,595,980 | 6/1986 | Innes | 395/758 |
| 4,751,740 | 6/1988 | Wright | 382/180 |
| 4,864,503 | 9/1989 | Tolin | 395/752 |
| 5,077,804 | 12/1991 | Richard | 382/138 |
| 5,101,349 | 3/1992 | Tokuume et al. | 395/759 |
| 5,535,120 | 7/1996 | Chong et al. | 395/753 |
| 5,583,761 | 12/1996 | Chou | 395/798 |

FOREIGN PATENT DOCUMENTS

| | | |
|---|---|---|
| A-0 048 064 | 3/1982 | European Pat. Off. . |
| A-0 150 273 | 8/1985 | European Pat. Off. . |
| 6-068144 | 3/1994 | Japan . |
| A-2 241 094 | 8/1991 | United Kingdom . |
| WO-A-88 05946 | 8/1988 | WIPO . |

*Primary Examiner*—Parshotam S. Lall
*Assistant Examiner*—Viet Vu
*Attorney, Agent, or Firm*—Antonelli, Terry, Stout, & Kraus, LLP

[57] ABSTRACT

A multi-language compatible service offering/receiving system. A service server and a service client are connected to a translation rule managing server is connected for managing translation rules for translating information expressing forms by way of an intermediate expression form. Upon sending of information from the service server to the service client, the service server translates a specific language contained in the data to be sent out into a language of the intermediate expression by referencing the translation rules. The service client translates the intermediate expression into specific expression by using the translation rules for displaying the data resulting from the translation. When the translation rules are unavailable in the service server and the service client, the translation rule is acquired from the translation rule managing server.

21 Claims, 14 Drawing Sheets

FIG.4

T-shirt

Sleeve
- long Sleeve
- ~~Short Sleeve~~

Size
- S (4'11~5'3)
- ~~M (5'3~5'7)~~
- L (5'7~5'11)
- LL (5'11~)

Color
- white
- ~~black~~
- red
- blue
- green
- yellow rotate | stop cotton 100%
machine wash
made in U.S.A.

Price $20.00 | order | notoder

```
[display-name D012345
  [category men's-wear]
  [specification
    [name t-shirt]      ~621
    [sleeve    [exclusive-choice long-sleeve, short-sleeve] ]
    [size    [exclusive-choice S(4'11-5'3), M(5'3-5'7),
                               L(5'7-5'11), LL(5'11-)] ]
    [color   [exclusive-choice white, black, red, blue,
                               green, yellow] ]
    [material cotton 100%]
    [washing-condition machine-wash]
    [made-in U.S.A.]
  ]
  [motion-picture "M00001"]
  [order [exclusive-choice order, not order] ]
]
```
(62)

FIG.7

```
 [[3   D0 1 2 3 4 5            632
   [4         1 0 2]
   [6
    [2 0 1    2]  631
    [3 0 5   [1 1    1    2] ]
    [2 0 4   [1 1    2 ([1 0 1    1.5]~  [1 0 1    1.6])
                     3 ([1 0 1    1.6]~  [1 0 1    1.7])
                     4 ([1 0 1    1.7]~  [1 0 1    1.8])
                     5 ([1 0 1    1.8]~ ) ] ]
    [2 0 3   [1 1    1    6    4    5    3    2] ]
    [3 0 6   1  [1 0 5    1 0 0] ]
    [3 0 4   1]
    [2 0 6   2]
  ]
  [1 2   FILE00001]
  [2 0 7   [1 1    1    2] ]
 ]
```

```
<sentence> ::= [ <display define statement> | <translation rule define statement> | <classifier define statement> | <item value define statement>
              | <scale unit define statement> ]                                                          ~711
<scale unit define statement> ::= [ scale unit (<scale unit>)'] ~717

<display define statement> ::= [ display name <name> (<classifier phrase> | <specification phrase> | <motion-picture phrase> | <order phrase> ]]
<category phrase> ::= [ category <classifier> ]
<specification phrase> ::= [ specification ([<item name> | <item phrase>])*] ']
<motion-picture phrase> ::= [ motion-picture <name>]
<order phrase> ::= [ order (<item value>)*]
<item phrase> ::= <item value> | <exclusive choice phrase> | <numerical phrase>
<exclusive choice phrase> ::= [ exclusive choice (<item value>)*]
<numerical phrase> ::= [ <item name> <numerical value> ]

<translation rule define statement> ::= [ translation rule <classifier> <upper-rank classifier>(<translation rulen phrase>)*]
<upper-rank classifier> ::= <classifier>
<translation rulen phrase> ::= <identifier translation phrase> | <classifier translation phrase> | ¦ <scale translation phrase>
                              | <item value translation phrase>
<identifier translation phrase> ::= [ identifier (<identifier>⇄<intermediate expression form>)*] ~712
<classifier translation phrase> ::= [ classifier (<classifier>⇄<intermediate expression form>)*] ~713
<item name translation phrase> ::= [ item name (<item name>⇄<intermediate expression form>)*] ~714
<item value translation phrase> ::= [ <item name>(<item value>⇄<intermediate expression form>)*] ~716
<scale translation phrase> ::= [ scale ([<variable> <scale unit>⇄ [ <item name> <mathematical expression>])] ~715
                              |[ <scale unit> <variable>⇄ [<item name> <expression>])] ~718
                                                                                        ~719
<classifier> ::= <character string> (but, defined with <classifier translation phrase>)  ~720
<item name> ::= <character string> (but, defined with <item name translation phrase>)
<item value> ::= <character string> (but, defined with <scale unit define statement>)
<scale unit> ::= <character string>
<mathematical expressions> ::= <four arithmetical operation expressions including variable>
<numerical value> ::= <numerical string> | <numerical string>
<variable> ::= # <character string>
<item value> ::= <character string>
<name> ::= <character string>
<intermediate expression form> ::= <character string>
<character string> ::= (<character>|-)*
<numerical string> ::= (<numerical>)*
```

FIG.9

```
<scale unit define statement> ::= [ scale unit (<scale unit>)*]
<display define statement> ::= [ display name <name> [(<classifier phrase> | <specification phrase>
                                | <motion picture phrase> | <order phrase>)]]  ~721
<category phrase> ::= [ category {(<classifier>)*]  ~722
<specification> ::= [ specification {([<item name> (<item phrase>)*])]*]
<motion picture> ::= [ motion picture <name>]
<order phrase> ::= [ order (<item value>)*]
<exclusive choice phrase> ::= [ exclusive choice (<item value>)*]
<translation rule define statement> ::= [ t-rule <classifier> <upper rank classifier>(<translation rulen phrase>)*] ~723
<identifier translation phrase> ::= [ identifier{<identifier> ⇄ <intermediate expression form>}*] ~724
<classifier translation phrase> ::= [ classifier{<classifier> ⇄ <intermediate expression form>}*]
<item name translation phrase> ::= [ item name{<item name> ⇄ <intermediate expression form>}*]
<scale translation phrase> ::= [ scale{([<variable> <scale unit> ⇄ [ (<item name> <mathematical expression>)])*]
```

```
[t-rule general none]
  [identifier
823  t-ruler ⇌ 1, display-name ⇌ 3,
     category ⇌ 4, none ⇌ 5, specification ⇌ 6,
     exclusive-choice ⇌ 11, motion-picture ⇌ 12 ]
  [classifier wear ⇌ 101, men's-wear ⇌ 102, women's-wear ⇌ 103]
  [item-name                    824
     length ⇌ 101, weight ⇌ 102, volume ⇌ 103, currency ⇌ 104,
     propotional ⇌ 105,
     name ⇌ 201, commet ⇌ 202, color ⇌ 203, size ⇌ 204,
     country-name ⇌ 205, made-in ⇌ 206, order ⇌ 207,
821  washing-condition ⇌ 301, sleeve ⇌ 302, material ⇌ 303]
  [color
     white ⇌ 1, yellow ⇌ 2, green ⇌ 3, red ⇌ 4, blue ⇌ 5, black ⇌ 6]
  [order
     order ⇌ 1, mot-order ⇌ 2]
  [scale
     [#X feet ⇌ [length #X/0.3048]],
     [#X inches ⇌ [length #X/0.0254]],
     [#X yards ⇌ [length #X/0.9144]],
     [#X lb ⇌ [weight #X/0.4536]],
     [#X ounce ⇌ [weight #X/0.02835]],
     [#X gal ⇌ [volume #X/0.0037853]],
     [$ #X ⇌ [currency #X]]],
]
[t-rule wear general          822
   [name sweater ⇌ 1, t-shirt ⇌ 2, cardigan ⇌ 3, suit ⇌ 4,
         jacket ⇌ 5, jeans ⇌ 6, pants ⇌ 7]
   [washing-condition machine-wash ⇌ 1, hand-wash ⇌ 2,
                      dry-wash ⇌ 3]
   [sleeve long-sleeve ⇌ 1, short-sleeve ⇌ 2]
   [material cotton ⇌ 1, wool ⇌ 2, silk ⇌ 3, nylon ⇌ 4,
             polyester ⇌ 5]
]
[t-rule men's-wear wear]
   [name slacks ⇌ 1, Y-shirt ⇌ 2]
   [sleeve sleeveless ⇌ 3]
   [size SS ⇌ 2, S ⇌ 3, M ⇌ 4, L ⇌ 5, LL ⇌ 6, XL ⇌ 7]
]
[t-rule women's-wear wear]
   [name dress ⇌ 1, blouse ⇌ 2, skirt ⇌ 3, pants ⇌ 4]
   [sleeve sleeveless ⇌ 3]
   [size 5 ⇌ 2, 7 ⇌ 3, 9 ⇌ 4, 11 ⇌ 5, 13 ⇌ 6, 15 ⇌ 7]
]
```

[ scale-unit feet, inches, yards, lb, ounce, gal, $ ] ~92

FIG.16

```
[ Translation-rule  general  none
    [ identifier    変換規則⇌t-rule,  上位規則⇌s-rule,  画面名称⇌display-name,
                    分類⇌category,   なし⇌noned,  仕様⇌specification,
                    排他的選択⇌exclusive-choice,  動画⇌motion-picture ]
    [ classifier    衣料品⇌wear,  紳士服⇌men's-wear,  婦人服⇌women's-wear ]
    [ item-name     長さ尺度⇌length-scale,  重量尺度⇌weight-scale,  容積尺度⇌volume-scale,
                    通貨尺度⇌currency-scale,  割合尺度⇌proportionnal-scale,
                    名称⇌name,  コメント⇌comment,  色⇌color,  サイズ⇌size,
                    国名⇌country,  製造国⇌made-in,  注文⇌order,
                    洗濯条件⇌washing-condition,  袖⇌sleeve,  素材⇌material ]
    [ color         白⇌white,  黄⇌yellow,  緑⇌green,  赤⇌red,  青⇌blue,  黒⇌black ]
    [ country-name  日本⇌Japanese,  アメリカ⇌U.S.A.,  イギリス⇌Englande,
                    フランス⇌France,  ドイツ⇌Germany ]
    [ order         する⇌order,  しない⇌non-order ]
    [ length-scale  #Y  m  ⇌ [長さ尺度  #X],
                    #Y  cm ⇌ [長さ尺度  #X／１００],
                    #Y  mm ⇌ [長さ尺度  #X／１０００]]
    [ weight-scale  #Y  kg ⇌ [重量尺度  #X],
                    #Y  g  ⇌ [重量尺度  #X／１０００],
                    #Y  t  ⇌ [重量尺度  １０００＊#X]]
    [ volume-scale  #Y  m3 ⇌ [容積尺度  #X],
                    #Y  l  ⇌ [容積尺度  #X／１０００] ]
    [ currency-scale #Y 円 ⇌ [通貨尺度  #X／円ドルレート]]
]
[ Translation-rule  wear  general
    [ name          セーター⇌sweater,  Tシャツ⇌t-shirt,  カーディガン⇌cardigan,  スーツ⇌suit,
                    ジャケット⇌jacket,  ジーンズ⇌jeans,  パンツ⇌pants ]
    [ washing-codition  洗濯機可⇌1,  手洗い⇌2,  ドライ⇌3 ]
    [ sleeve        長袖⇌long-sleeve,  半袖⇌short-sleeve ]
    [ material      綿⇌cotton,  羊毛⇌wool,  絹⇌silk,  ナイロン⇌nylon,  ポリエステル⇌polyster ]
    [ length-scale  [#Y  cm ⇌ [長さ尺度  #X ／１００]]
]
[ Translation-rule  men's  wear
    [ name          スラックス⇌slacks,  Yシャツ⇌Y-shirt ]
    [ sleeve        袖なし⇌sleeveless ]
    [ size          SS⇌SSS,  S⇌SS,  M⇌S,  L⇌M,  LL⇌L,  XL⇌LL ]
]
[ Translation-rule  women's  wear
    [ name          ドレス⇌dress,  ブラウス⇌blouse,  スカート⇌skirt,  パンツ⇌pants ]
    [ sleeve        ノースリーブ⇌sleeveless]
    [ size          7⇌5,  9⇌7,  11⇌9,  13⇌11,  15⇌13 ]
]
```

COMMUNICATION SERVICE SYSTEM EMPLOYING TRANSLATION RULES FOR COMMUNICATING DATA IN DIFFERENT LANGUAGES ALONG A NETWORK

BACKGROUND OF THE INVENTION

The present invention relates generally to a multi-language compatible service offering/receiving system which includes a plurality of information processing apparatuses interconnected via a network.

In recent years, a new conception of the information network referred to as a world wide web (WWW in abbreviation) made an appearance in the field of the internet technology, and at present, structurization of such a system which allows any one to make easy access to information on a worldwide scale and which is capable of delivering information all over the world is in progress by resorting to utilization of multimedia techniques which can cope or deal with character data, picture data, video data, audio data and the like in a consolidated manner together with hyper text technique for mutually combining a variety of data. In reality, utilization of the WWW in the commercial field already began, as typified by business advertisements, so-called home shoppings and like services. However, at present, the greater part of information on the world wide web or WWW system is offered in home or native languages or in English over the world. Under the circumstances, for the information of the service to be presented in a plurality of languages, programs of a same content have to be prepared in respective languages correspondingly.

Certainly, computer-based machine translation has made progress in study and practical applications. However, such machine translation is primarily concerned with translation between two specific languages, as exemplified by Japanese-to/from English translation, Japanese-to/from French translation and so forth. In this conjunction, there is known a so-called pivot translation system according to which Japanese language, for example, is translated once into an intermediate language which is then translated, for example, into English. This translation system is certainly advantageous in that a smaller number of translation rules is sufficient for the translation because every language of concern is once translated into an intermediate language.

However, attempt for implementation of such a system which allows people all over the world to offer and/or enjoy services through the medium of information processing apparatuses or computers, to say in another way, in a common network environment encounters difficulty due to difference in language, measure or scale units such as unit of length, unit of weight, unit of volume and unit of currency. Thus, not a little burden is involved in the translation of languages as well as the conversion of scale units and currency units. By way of example, translation of English into Japanese and vice versa, conversion of length unit from feet/inch rule to centimeter/millimeter rule and vice versa as well as conversion of currency unit from U.S. dollar to Japanese yen and vice versa require troublesome and time-consuming procedures.

On the other hand, in order that all people receiving services can enjoy such services in their own native languages, respectively, the party who offers the services is forced to develop service offer programs in correspondence to a number of different languages and a plurality of different scale units, respectively, which of course impose a great burden on the offerer.

Such being the circumstances, there exists a problem how to implement an apparatus for translating mutually information expressing forms used in individual countries in order to realize network system of a worldwide scale which permits the service offerers and the service receivers to be conscious of only the familiar information expressing forms which are based on the cultures prevailing in the blocs such as countries, districts or the like where they live. Typical one of such information expressing forms is native language. In this conjunction, there must be mentioned a problem concerning classification of the information expressing forms among others.

More specifically, in U.S.A, Japan and many other countries, a unitary language and a unitary scale system or rule are adopted with some exceptions. By contrast, in Switzerland and Canada, a plurality of languages are admitted as official languages while the currency is standardized. Besides, even in countries belonging to a same language bloc, same expression may have different contents. By way of example, a unitary same expression such as "LL size of women's wear" actually represents different sizes in U.S.A and England. Thus, in the situation in which a variety of information expressing forms are mixedly coexistent, there arises a serious problem as to realization of the means or facility which is capable of classifying the information expressing forms so that the end users can select the pertinent classification and thus the proper information expressing form.

SUMMARY OF THE INVENTION

In the light of the state of the art described above, it is an object of the present invention to provide an information processing apparatus equipped with an information expressing form translating facility compatible with network, which apparatus allows service offerers as well as service receivers to offer or receive services on a worldwide basis while being conscious of only the information expressing forms based on the cultures in their own countries such as native languages, their own scale units, their own currency units.

Further, it is an object of the present invention to provide multi-language compatible service offering/receiving system implemented by making use of the information expressing form translating facility mentioned above.

In view of the above and other objects which will become apparent as the description proceeds, it is proposed according to the present invention to provide an information processing apparatus (hereinafter referred to also as translation rule managing server) which serves for controlling or managing the rules (hereinafter referred to as translation rules) for translating specific information expressing forms which differ in dependence on countries, districts and/or blocs, and to connect the translation rule managing server to a network to which an information processing apparatus or apparatuses for offering services (hereinafter referred to as the service "server") and an information processing apparatus or apparatuses for receiving services (hereinafter referred to as the service "client") are connected.

For implementing the translation rule managing server, there may be conceived two schemes, i.e., a first scheme according to which additional information processing apparatuses are provided discretely for every specific information expressing forms, respectively, wherein translation rules for the specific information expressing forms are stored in the corresponding or relevant information processing apparatuses, respectively, and a second scheme according to which translation rules for all the specific information expressing forms are uniformly stored in all the translation rule managing servers, respectively. In practical applications, however, the first mentioned scheme should preferably be adopted because the second scheme is rather disadvantageous when compared with the first scheme in the respects that a large amount of data has to be held by each service server and that large amount of data has to be transferred to each of the translation rule managing server upon updating of the translation rules.

In conjunction with the translation of the specific information expressing forms, there are conceived a method of translating the specific information expressing forms by the translation rule managing server and a method of transferring previously the translation rules used by users from the translation rule managing server to the associated service servers and service clients, respectively, for thereby allowing the specific information expressing forms to be translated by the individual service servers and service clients, respectively.

In a mode for carrying out the invention, when data held by a storage unit incorporated in the service server is to be sent onto the network, decision is made as to whether the data to be sent out contains data for specific information expressing forms. When the specific information expressing form data is contained, then the data is translated into an information expressing form common to the information processing apparatuses on the network, whereon data containing the data resulting from the translation are sent onto the network. The data to be sent out may contain universal expressions such as numerals which require no translation and specific expressions which are to undergo the translation. In this conjunction, it is important to translate the specific expressions into intermediate information expressing forms before sending.

When the service client receives the data via the network, decision is made as to whether the data received contains those data given in the common information expressing forms. When the latter are contained, the information expressing forms are previously translated into the specific information expressing forms inherent to the information processing apparatus constituting the service client, whereon the specific expressions are displayed on a display device.

In the translations performed in the service server and the service client, translation rules are employed. In this conjunction, it is preferred to provide the translation rules with the attributes of category names or classifiers and item names and additionally a facility for making it possible to define hierarchical relation among the categories so that unless a translation rule is not defined with a category of hierarchically lower rank (lower concept), then the translation rule defined with a category of hierarchically higher or upper rank can be employed in succession. By virtue of this arrangement, ambiguousness of the expression resulting from the translation can be reduced or suppressed while allowing the amount of data for describing the translation rules to be decreased.

The specific information expressing forms may be classified on the basis of blocs (districts or zones) where the specific information expressing forms are used or on the basis of languages such as Japanese, English and French in which the specific information expressing forms are given or on the basis of scale units, e.g. units of length, the metric system, the yard system, etc. in addition to the classification on the basis of countries. In this conjunction, it is noted that for the purpose of managing the communication addresses of the translation rule managing servers, such facility should preferably be provided which can manage the communication addresses not only on the basis of countries but also on the basis of blocs, languages and the scale units to thereby inform the service server and the service client of the communication addresses of the translation rule managing servers which manage the translation rules for the specific information expressing forms classified on the basis of countries, blocs, languages and scale units, respectively. In that case, each of storage units incorporated in the service server and the service client, respectively, should be provided with an area for storing the addresses of the plural translation rule managing servers. Further, a translation rule acquiring unit should be provided in association with each of the service server and the service client so that when the rule relevant to a lexical unit or token to be translated is absent in the own storage unit, different translation rule managing servers can be accessed on the basis of the classes to which the lexical units belong.

By providing the service server and the service client with the translation rules and the translation processing units, respectively, to thereby carry out the translation processings locally, load imposed thereon can be distributed, whereby response capability is prevented from lowering, which may otherwise occur due to concentration of the processings. Further, owing to such arrangement that the translation rule can be acquired from the translation rule managing server as occasion requires, it is possible to update the translation rule(s) of the service server and the service client as it becomes necessary.

Furthermore, by providing the facility for defining the hierarchical relations among categories and the facility for making it possible to use in succession the translation rule defined for a category of higher rank when no translation rule is defined for a category of lower rank, the amount of description for the translation rules can be reduced. By way of example, in the case of domestic use electric/electronic apparatuses, outer dimensions thereof are generally expressed in "millimeter or mm". This holds true for television sets, refrigerators and washing machines. However, screen size of the television set is generally expressed in inch. Under the circumstance, such rule is defined to force the translation of dimensions in millimeter for a category "domestic use electric/electronic apparatus" which hierarchically ranks higher than categories "television set", "refrigerator" and "washing machine" while defining the translation rule for the screen size of television set so that it is expressed in "inch" after translation. Thus, necessity for defining the outer dimensions individually for the television set, the refrigerator and the washing machine, respectively, can be avoided, whereby the amount of description for the translation rules can be decreased.

With the system according to the invention, multilinguistic countries and multiracial nations can be coped with satisfactorily. By way of example, in a country such as Canada which is divided into different culture blocs, the translation rule managing servers which differ from one another in respect to the translation rules on a district-by-district basis may be provided in association with the different culture blocs. In that case, by designating the name of the district of concern or designating the communication address of the server in charge of managing the translation rules for that district, the user can easily designate the specific information expressing form which the user is familiar with, whereby he or she can perform read/write operations comfortably by using the familiar expression form. However, for coping with such a country where the culture blocs are not definitely divided, it is also proposed that the translation rules should be managed on a language-by-language basis or on a scale-unit basis. In that case, such facility should be provided which allows the user to designate desired specific information expressing form on the basis of the language or scale unit and which makes it possible to access automatically the server managing the translation rule relevant to the specific information expressing form designated by the user.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 4 is a view showing, by way of example, a screen display for American as generated in the system according to the first embodiment of the invention;

FIG. 5 is a view for illustrating a display structure description in Japanese, which corresponds to the screen display shown in FIG. 3;

FIG. 6 is a view for illustrating a display structure description in English, which corresponds to the screen display shown in FIG. 4;

FIG. 7 is a view showing, by way of example, a display structure description in an intermediate expression form, which corresponds to the display structure descriptions shown in FIGS. 5 and 6, respectively;

FIG. 8 is a view for illustrating syntax rules for the data defining a screen display structure and translation rules for Japanese;

FIG. 9 is a view for illustrating syntax rules for the data defining a screen display structure and translation rules for American;

FIG. 11 is a view for illustrating, by way of example, translation rules for the translation between a specific expression form in Japanese and an intermediate expression form;

FIG. 12 is a view for illustrating, by way of example, translation rules for the translation between a specific expression form in English and an intermediate expression form;

FIG. 13 is a view for illustrating a scale unit define statement in Japanese;

FIG. 14 is a view for illustrating a scale unit define statement in English;

FIG. 16 is a view for illustrating translation rules for translation between Japanese words and English words used in intermediate expression form according to a third embodiment of the present invention.

DESCRIPTION OF THE PREFERRED EMBODIMENTS

Now, the present invention will be described in detail in conjunction with what is presently considered as preferred or typical embodiments thereof by reference to the drawings.

For implementing the invention, there are connected to a communication network at least one first information processing apparatus (referred to as the service server) and at least one second information processing apparatus (referred to as the service client) which are capable of communicating with each other via the network, and additionally at least one third information processing apparatus (referred to as the translation rule management server) which performs mutual translation of information expressing forms in the interactions carried out between the service server and the service client.

In the following description of the exemplary embodiments of the invention, it is assumed that translation rules prepared by making use of an intermediate expression form are employed to be referenced upon translation of the forms for expressing information such as languages used in the service server on one hand and the service client on the other hand. As the third information processing apparatus, i.e., the translation rule management server, there may be allocated information processing apparatuses for the different information expressing forms, respectively, in a one-to-one correspondence, or alternatively all the translation rules may be stored en bloc uniformly in all of the translation rule management servers, respectively. In the following description of the typical embodiments of the invention, it is presumed that the third information processing apparatus or the translation rule management server is provided in correspondence to each of the information expressing forms.

Embodiment 1

At first, description will be directed to an arrangement in which both the service server and the service client are designed to perform the translation processings, respectively.

Figure 1:
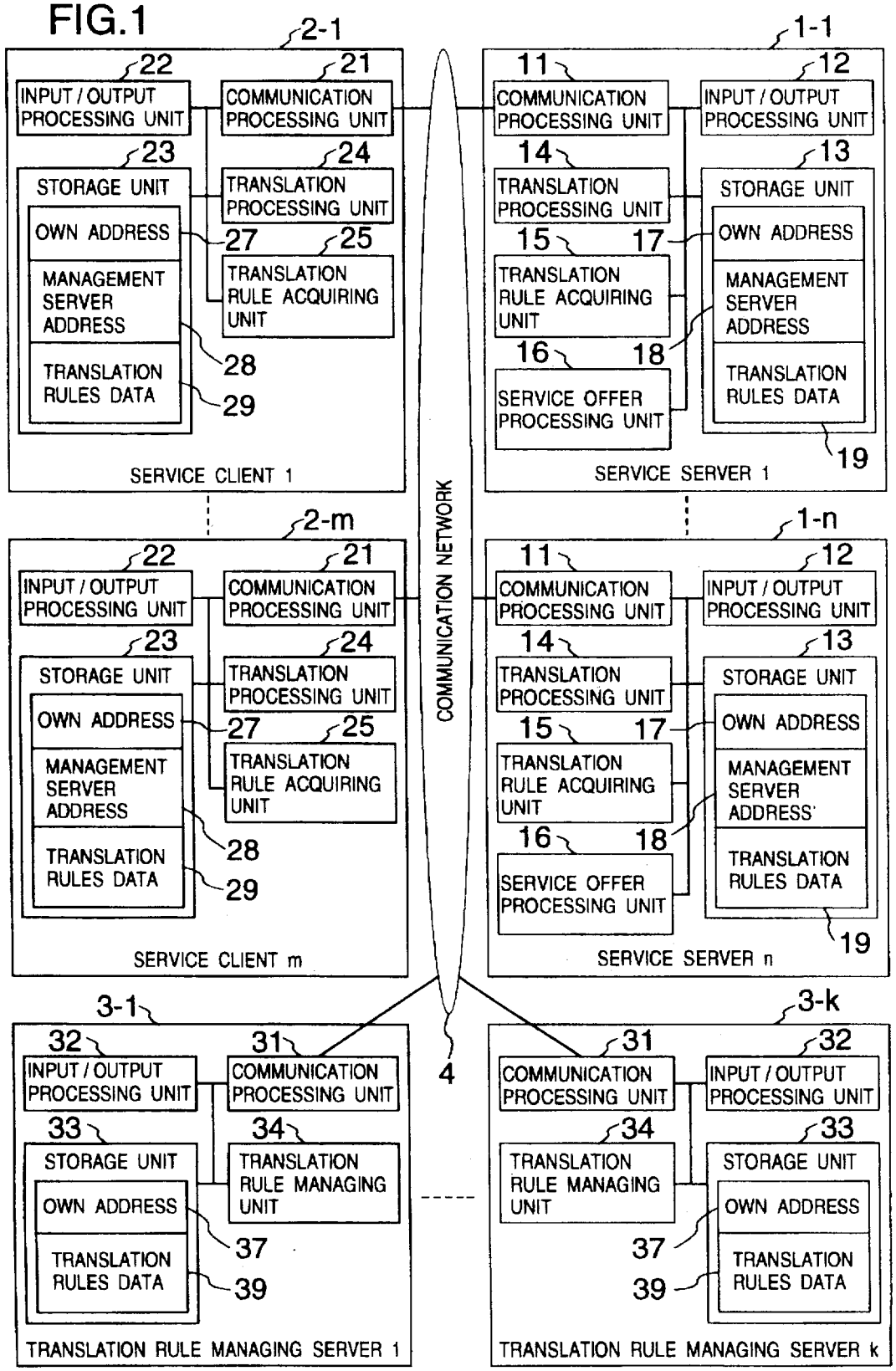
FIG. 1 is a block diagram showing in general an arrangement of a service presenting or offering system according to a first embodiment of the present invention.

FIG. 1 is a block diagram showing in general an arrangement of the multi-language compatible service offering/receiving system according to a first embodiment of the present invention. Referring to the figure, there are provided service servers 1-1, . . . 1-n each constituted by an information processing apparatus for offering services by furnishing or sending data (hereinafter, an arbitrary service server among the service servers 1-1, . . . 1-n is denoted as service server 1 in order to omit for the sake of simplicity), service clients 2-1, . . . 2-m each constituted by an information processing apparatus for enjoying the services by receiving the data supplied from the service server 1 (hereinafter, an arbitrary service client among the service clients 2-1, . . . 2-m is denoted as service client 2 in order to omit for the sake of simplicity) and translation rule managing servers 3-1, . . . 3-k each constituted by an information processing apparatus which is in charge of controlling or managing translation rules for the translation of the forms in which the data transferred between the service server 1 and the service client 2 are expressed (hereinafter, an arbitrary translation rule managing server among the translation rule managing servers 3-1, . . . 3-k is denoted as translation rule managing server 3). These forms are referred to as the information expressing forms. The information processing apparatuses mentioned above are interconnected through the medium of a communication network 4 such as a so-called internet or the like.

As is shown in FIG. 1, each of the service servers 1 includes a communication processing unit 11 for performing communication with the other information processing apparatuses, an input/output processing unit 12 for processing data to be inputted/outputted, a storage unit 13 for storing a variety of data, a translation processing unit 14 for translating the information expressing forms of the data to be sent out and the data to be received, respectively, a translation rule acquiring unit 15 for acquiring translation rules from the translation rule managing server 3 upon encountering an unknown information expressing form, and a service offer processing unit 16 for executing processings involved in offering services. The storage unit 13 is allocated with an own address area 17 where the communication address of the service server 1 itself is stored, a management server address area 18 for storing a communication address of the translation rule managing server 3 which is in charge of managing the translation rules for the information expressing form adopted in the service server 1, and areas destined for storing data 19 for the translation rules as acquired from the translation rule managing server 3 mentioned above and data (not shown) to be presented to the service client.

Each of the service clients 2 in turn is composed of a communication processing unit 21 for enabling communication with the other information processing apparatus, an input/output processing unit 22 for processing the data to be inputted/outputted, a storage unit 23 for storing a variety of data, a translation processing unit 24 for translating the information expressing forms of the data to be sent and the data to be received, respectively, and a translation rule acquiring unit 25 for acquiring translation rule(s) from the translation rule managing server 3 upon encountering an unknown information expressing form. The storage unit 23 includes an own address area 27 for storing the address of the service client 2 itself, a management server address area 28 and an area for storing data 29 for the translation rules and others, as in the case of the storage unit 13 mentioned previously.

On the other hand, the translation rule managing server 3 is comprised of a communication processing unit 31 designed for conducting communication with the other information processing apparatuses, an input/output processing unit 32 for processing data to be inputted/outputted, a storage unit 33 for storing a variety of data, and a translation rule managing module or unit 34 for controlling or managing the translation. rules to be sent out in response to a request issued from the service server 1 or the service client 2. The storage unit 33 includes an own address area 37 for storing the communication address of the translation rule managing server 3 itself and an area for storing data 39 for the translation rules to be sent to the service server 1 or to the service client 2.

Next, operation of the multi-language compatible service offering/receiving system according to the instant embodiment of the invention will be explained on the assumption, by way of example only, that a consumer resident in Japan receives service from a service offerer or presenter resident in U.S.A with the consumer staying at "home (known as a home shopping service") and that the service server 1 is installed at a given place in U.S.A with the service client 2 being installed in Japan. In that case, the translation rule managing server 3 may be located at any given place (i.e., in Japan, U.S.A or in any other country).

Figure 3:
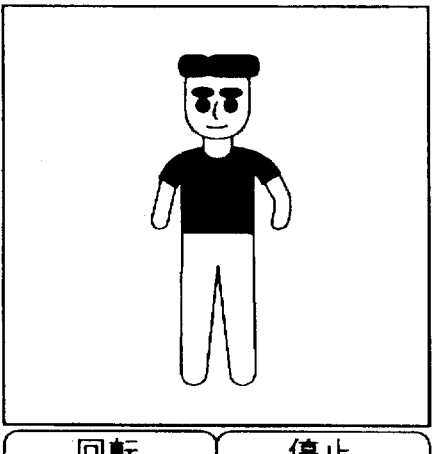
FIG. 3 is a view showing, by way of example, a screen display for Japanese as generated in the system according to the first embodiment of the invention.

At first, general description will be made of the processing procedure involved in the so-called home shopping service. Initially, a service offerer resident in U.S.A prepares or generates a display structure description 62 illustrated in FIG. 6 on the basis of a screen display 52 for the service clients located or resident in U.S.A. The display structure description 62 as generated is stored in the storage unit 13 incorporated in the service server 1. At this juncture, it should be mentioned that a display structure description 63 translated previously into an information expressing form such as illustrated in FIG. 7 may be stored in the storage unit 13 in place of the display structure description 62. When a Japanese consumer makes access to the service server 1 from the service client 2 via the communication network 4, then the service server 1 responds thereto by translating the display structure description 62 into the display structure description 63 of an intermediate expression form with the aid of the translation processing unit 15. Of course, when the display structure description 63 of the intermediate expression form has previously been stored in the storage unit 13, the translation processing mentioned above is rendered unnecessary. The display structure description 63 of the intermediate expression form is then sent to the consumer or customer in Japan. Upon reception of the display structure description 63, the service client 2 translates the display structure description 63 into a Japanese-bound display structure description 61 illustrated in FIG. 5 with the aid of the translation processing unit 24. In succession, the service client 2 generates a display 51 for Japanese in the input/output processing unit 22, as illustrated in FIG. 3. At this juncture, it should be mentioned that all the display structure descriptions illustrated in FIGS. 5, 6 and 7 conform to a display define statement 711 contained in syntax rules 71 which are described in Backus-Naur form and shown in FIG. 8. Details of the contents shown in FIG. 8 will be elucidated later on.

Figures 5, 6:
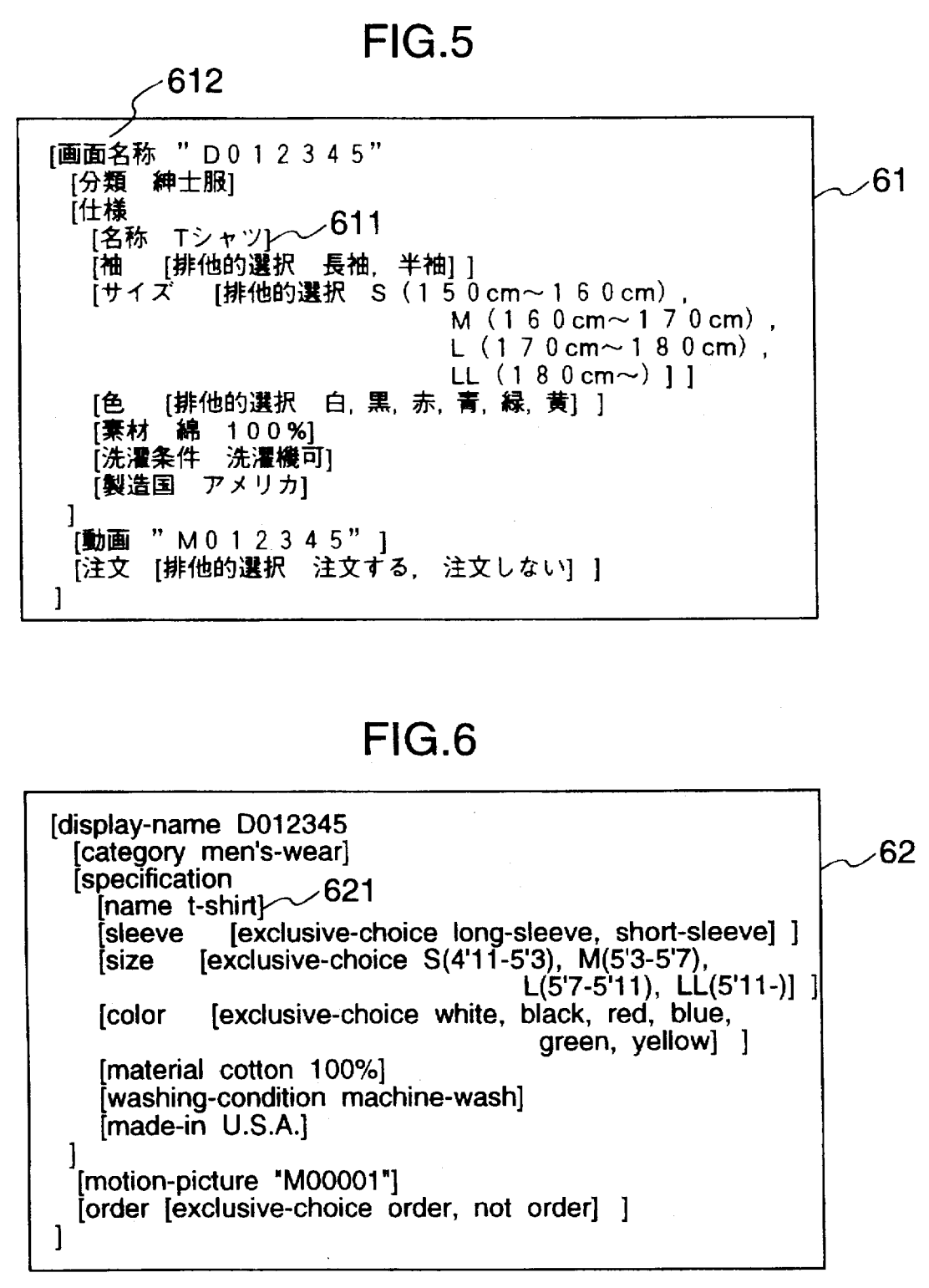

Now, assume, by way of example only, that the service offerer resident in U.S.A prepares catalogue shopping information of a T-shirt in English in accordance with the form of the display 52 illustrated in FIG. 4. As a result of this, a display structure description 62 illustrated in FIG. 6 is generated, which is then translated once into a display structure description 63 of the intermediate expression form such as illustrated in FIG. 7. More particularly, an item name [name T-shirt] 621 contained in the display structure description 62 is translated into an item name [201 2] 631 contained in the display structure description 63 of the intermediate expression form in accordance with translation rules 821 and 822 illustrated in FIG. 12. Upon reception of the display structure description 63 of the intermediate expression form, the service client 2 in Japan translates the display structure description 63 into a Japanese display structure description 61 shown in FIG. 5. By way of example, the item name [201 2] 631 of the intermediate expression form (see FIG. 7) is translated into [名称Tシャツ] 611 contained in the Japanese display structure description 61 (FIG. 5) in accordance with the translation rules 811 and 812 illustrated in FIG. 11. Thus, there is made available to the Japanese consumer or client a display 51 for Japanese generated in conformance with the display structure description 61 resulting from the translation mentioned above. When the Japanese client selects a T-shirt of "半袖·Mサイズ·黒 (short-sleeve, medium size, black)" from the displayed information 51, then the corresponding locations are displayed in reverse, indicating that the T-shirt of specific specifications has been chosen. At the same time, the purchase price therefor is displayed in yens. This information is then translated into a corresponding English expression form by way of an intermediate expression form and sent to the service offerer resident in U.S.A. In this manner, the service offerer resident in U.S.A can confirm choice of a specific item (specific T-shirt in this case) on the basis of the change of relevant locations of the display 52 such as display in reverse and the purchase price in dollar.

Figure 2:
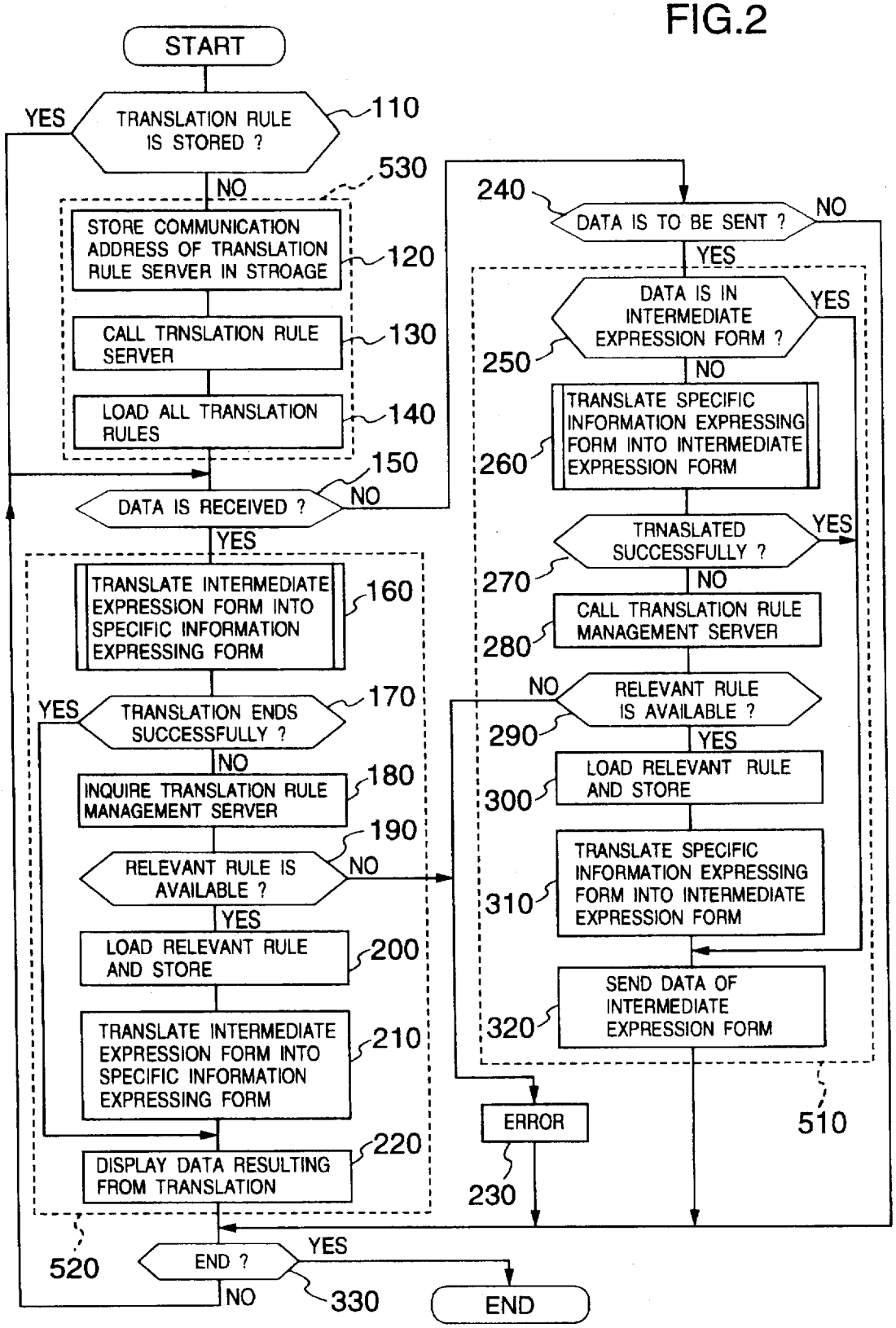
FIG. 2 is a flow chart for illustrating generally data transfer processings executed by a service server and a service client in the system shown in FIG. 1.

FIG. 2 is a flow chart for illustrating in general and in common those processings which are involved in the data transfer between the service server 1 and the service client 2, wherein the processing steps executed by the service server 1 is designated within a broken-line block 510 with the processing steps to be executed by the service client 2 being designated within a broken-line block 520. On the other hand, the processing steps executed by the service server 1 or required for the service client 2 to acquire the translation rules from the translation rule managing server 3 is shown in a broken-line block 530.

As can be seen in FIG. 2, the service server 1 or the service client 2 first checks whether or not the translation rule data 19 or 29 is stored in the respective storage unit 13 or 23. When neither translation rule data 19 nor the translation rule data 29 is stored, the service server 1 or the service client 2 executes the translation rule acquisition processings shown in the block 530. If otherwise, the processing proceeds to a step 150. When the data are to be transmitted, i.e., when the service server 1 is accessed by the service client 2 (steps 150 and 240), the service server 1 executes processing steps shown in the block 510. In case the data is to be received, i.e., when the service client 2 receives the display structure description 63 sent from the service server 1 via the communication processing unit 21 (step 150), the service client 2 executes the processing shown in the block 520.

Now, the processings outlined above will be elucidated in more concrete.

At first, the translation rule acquiring unit 25 constituting a part of the service client 2 checks as to whether or not the translation rule data 29 is stored in the storage unit 23 in a step 110. In case the translation rule data 29 is stored (i.e., when the decision step 110 results in affirmation ("Y"), the processing proceeds to a step 150. If otherwise (i.e., when the step 110 is negative "N", the translation rule acquiring unit 25 of the service client 2 refers to a translation rule name inputted by the user or client with the aid of the input/output processing unit 22 to thereby determine the communication address of the translation rule managing server 3 which holds the translation rule of concern by executing a table retrieval procedure, whereupon the communication address as determined on the basis of the translation rule name inputted by the user is stored in the storage unit 23 (step 120). In succession, the translation rule acquiring unit 25 of the service client 2 calls the translation rule managing server 3 which corresponds to the translation rule managing server address 28 through the communication processing unit 21 (step 130), whereupon the translation rule data 39 are wholly stored or loaded in the storage unit 23 incorporated in the service client 2 to be used as the translation rule data 29 (step 140).

In response to the access to the service server 1 by the service client 2, the communication processing unit 14 constituting a part of the service server 1 checks whether or not the display structure description stored in the storage unit 13 is of the intermediate expression form (step 250). This check processing can be realized, by way of example, by checking whether or not "画面名称 (display name)" designated by reference character 612 in FIG. 5 is given in terms of a numerical code "3" 632, as illustrated in FIG. 7. When the check mentioned above shows that the display structure description is of the intermediate expression form (FIG. 7), the communication processing unit 11 sends intact out the display structure description data onto the communication network 4 (step 320). On the contrary, when it is found that the display structure description stored in the storage unit 13 is not of the intermediate expression form, the communication processing unit 14 tries to translate the display structure description 62 bound for the clients in U.S.A into the display structure description 63 of the intermediate expression form (step 260). When the translation ends successfully (step 270), the communication processing unit 11 sends out the display structure description 63 onto the communication network 4 for transmission (step 320). By contrast, in case the translation ends in failure (step 270), the translation rule acquiring unit 15 calls the translation rule managing server 3 which corresponds to the managing server address 18 stored in the storage unit 13 with the aid of the communication processing unit 11 (step 280). When the relevant translation rule is unavailable from the translation rule managing server 3 (step 290), an error message is sent to the user (step 230). In this conjunction, it should be noted that such error message may be realized by displaying only the error information or by displaying the language used before the translation or a similar language together with error information.

When the relevant or pertinent translation rule is found (step 290), the translation rule acquiring unit 15 acquires the relevant translation rule by way of the communication processing unit 11, whereby the translation rule data is stored in the storage unit 13 (step 300). In succession, the translation processing unit 24 performs translation of the display structure description to the intermediate expression form by making use of the acquired translation rules in a step 310, whereon the communication processing unit 11 sends out the display structure description 63 of the intermediate expression form (FIG. 7) in a step 320.

Upon reception of the display structure description 63 by the service client 2 through the communication processing unit 21 (step 150), the translation processing unit 24 of the service client 2 executes the processing for translating the display structure description 63 into the display structure description 61 (FIG. 7) of Japanese version (FIG. 5) in a step 160. When the translation has been performed successfully (step 170), the input/output processing unit 22 generates the display 51 of Japanese version (FIG. 3) in a step 220. On the other hand, when the translation results in failure (step 170), the translation rule acquiring unit 25 calls the translation rule managing server 3 with the aid of the communication processing unit 21 (step 180). Unless the relevant translation rules are available from the translation rule managing server 3 (step 190), an error message is issued to the user (step 230). On the other hand, when the pertinent translation rules are available (step 190), the translation rule is loaded through the communication processing unit 21 to be stored in the storage unit 23 (step 200). Subsequently, the translation processing unit 24 translates the display structure description 63 into the display structure description 61 of Japanese version in accordance with the translation rule (step 210), whereupon the input/output processing unit 22 generates to output the display 51 of Japanese version (step 220) to be output to a display device.

When a consumer resident in other countries than Japan such as a consumer resident, for example, in Germany or France receives the service mentioned above, the translation rules for translating the intermediate expression form into a display structure description for German or French may be provided for allowing the display of German or French version to be generated.

Figure 10:
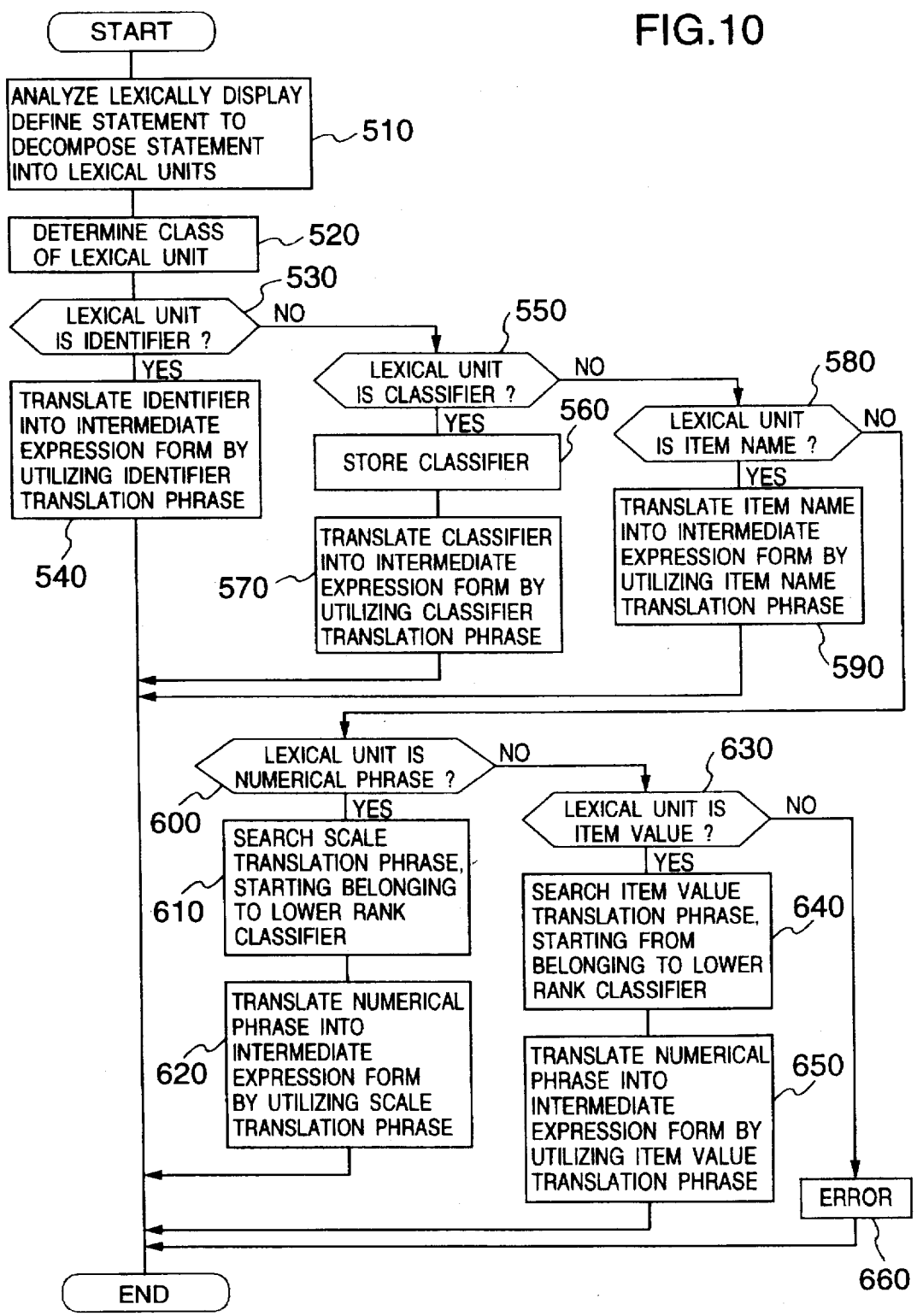
FIG. 10 is a flow chart showing the translation processings executed by a translation processing unit.
Figure 11:
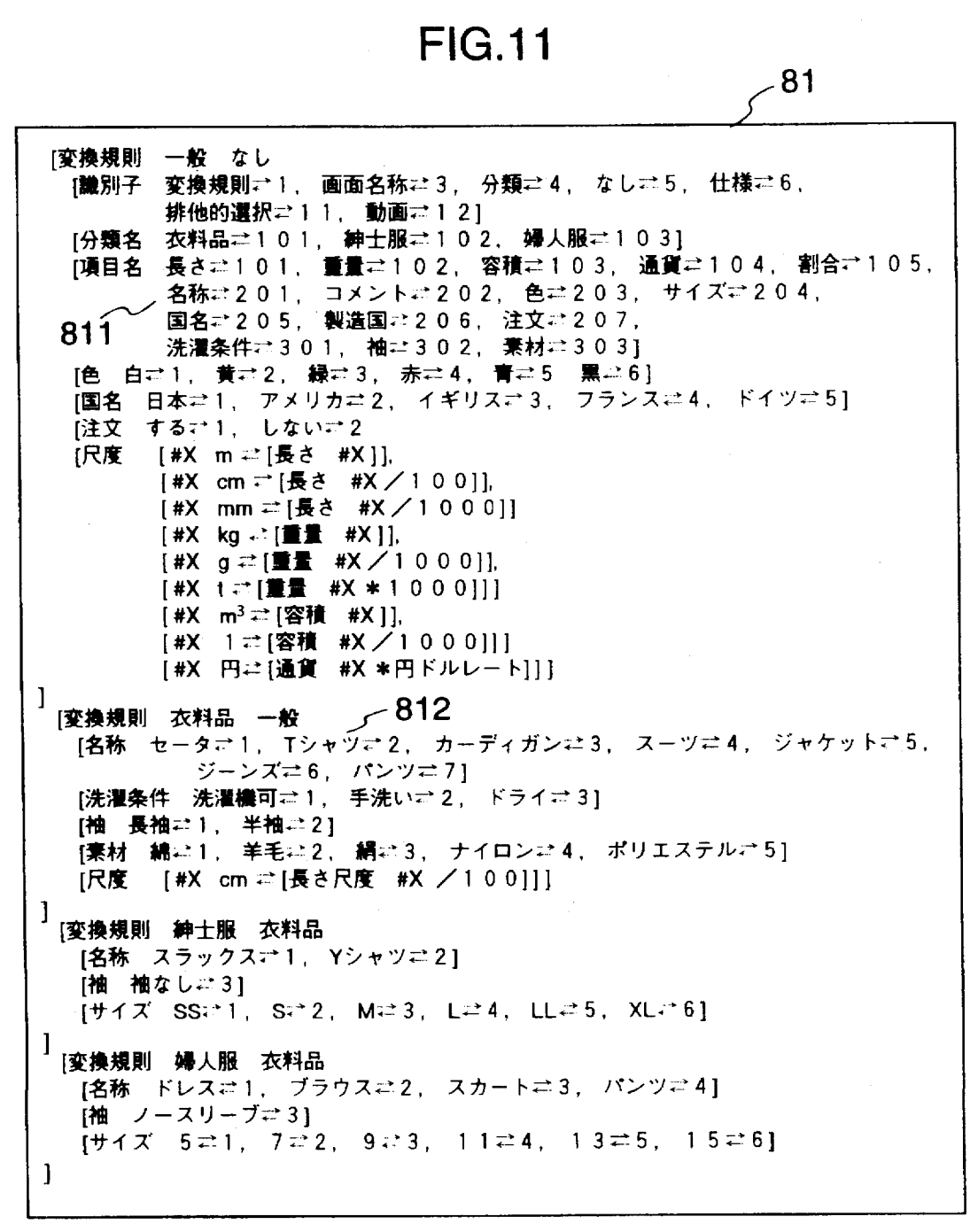

FIG. 10 is a flow chart showing the translation processings executed by the communication processing units 14 and 24 of the service server 1 and the service client 2, respectively, and illustrates in more detail the processings executed at the steps 160 and 260 shown in FIG. 2. Although the following description is directed to the translation processing for translating a specific information expressing form into an intermediate expression form in the step 260, it should be understood that the following description can equally read on the processing for translating the intermediate expression form into a specific information expressing form by replacing the description translation into intermediate expression form" inserted in steps 540, 570, 590, 620 and 650 shown in FIG. 10 by "translation into specific information expressing form". Further, because it is assumed that the processing in the step 260 is executed by the service server 1 installed in U.S.A, the translation rule 82 is destined for use in the translation between the information expressing form for American shown in FIG. 12 and the intermediate expression form. It goes however without saying that in case the processing in the step 160 is executed by the service client 2 installed in Japan, the translation rule 81 shown in FIG. 11 is employed for effecting translation between the information expressing form for Japanese and the intermediate expression form. Incidentally, it should be added that the translation rules 81 and 82 are described in accordance with the syntax rules 71 and 72 illustrated in FIGS. 8 and 9, respectively, wherein the translation rule 81 is stored in the storage unit 23 of the service client 2 in Japan while the translation rule 82 is stored in the storage unit 13 of the service server 1 in U.S.A.

Before entering into description of the translation processing, syntax rules providing the basis for the translation rule 81 and 82 employed in the translation processing will first be elucidated.

FIG. 8 is a view for illustrating the syntax rules 71 stipulating the description form for the translation rules 81, and FIG. 9 is a view for illustrating the syntax rules 72 prescribing the description form for the translation rules 82. In each of the syntax rules shown in FIGS. 8 and 9, item at the left-hand side is defined by the composition at the right-hand side. By way of example, considering a rule 717 for a scale unit define statement, it will be understood that "scale unit define statement" is defined by a composition in which "scale unit" and "description defined by <scale unit> 720 or repetition thereof" are juxtaposed.

By the way, in conjunction with description in a natural language, it is noted that a word of one and the same spelling may have different meanings. Accordingly, translation of a word of one natural language into a word of another natural language may result in ambiguousness or error. By way of example, a Japanese word "あめ" has different contents or meanings, i.e.., "rain" and "candy" in English, respectively. Thus, English translation of "あめ" will be accompanied with ambiguousness or error. Furthermore, with regard to the scale or unit of length, it is noted that although the unit systems are standardized legally on a nation-by-nation basis, statutory regulations are not always imposed on the expression of the units. By way of example, a metric system is adopted as the unit of length. However, there is established no regulation as to whether the length is to be expressed in "mm (millimeter)", "cm (centimeter)" or "m (meter)", giving rise to a problem of ambiguity. Nevertheless, meanings of the words and the scale unit such as unit of length, weight, volume, currency or the like can essentially be determined in dependence on the fields and the situations in which they are used. Accordingly, it is possible to translate definitely the word with correct meaning by designating the word together with the field and/situation in which the word is used. For the reason mentioned above, there are provided items "classifier" 718 and "item name" 719 in the translation rules.

In this conjunction, it is however noted that when the translation rule is defined for each of the items resulting from the classification in detail, the translation rules will then amount to an enormously large number. By way of example, when classes "men's wear", "women's wear" and "children's wear" are provided, the height which is usually used for indicating the size is generally expressed in "cm". Accordingly, with a view to reducing the amount of descriptions defining the translation rules, there is provided an upper-rank category "wear" which covers all the "men's wear", "women's wear" and "children's wear", wherein the height is expressed in "cm", so that the translation of "men's wear", "women's wear" and "children's wear" can be realized in accordance with the translation rule defined for the upper-rank category "wear".

Parenthetically, in the case of the instant embodiment of the invention, the MKS (meter-kilogram-second) system is adopted as the intermediate scale units concerning the physical quantities, wherein the length is expressed in meter and the weight is in kilogram with volume in cubic meter, while the intermediate scale unit of the currency is given in terms of U.S. dollar. It should however be appreciated that any other units may be resorted to. For example, the length may be given in accordance with the yard/feet system, while the unit of currency may be expressed in Japanese yen.

On the other hand, the scale units in individual countries are defined by the scale unit define statement 717. In this conjunction, a scale unit define statement 91 for Japanese is shown in FIG. 13 while scale unit define statement 92 for American is illustrated in FIG. 14.

Now, the translation processing will be elucidated in detail by reference to FIG. 10. At first, the display define sentence 711 is referenced to analyze lexically the display structure description 62 which is subject to the translation, by decomposing the display structure description 62 into a string of lexical units or tokens by making use of delimiters (e.g. space, common and the like) in the step 510. Subsequently, by extracting the lexical units one by one from the lexical unit string resulting from the decomposition, the class of the lexical unit or token is identified in a step 520. In case the lexical unit is found as representing an identifier (step 530), the identifier is then translated into a corresponding intermediate expression form by making use of an identifier translation phrase 712 shown in FIG. 8 (step 540). On the other hand, when the lexical unit of concern is found as representing a classifier (step 550), the classifier is then stored in the storage unit 13 (step 560), whereupon the classifier is translated into a pertinent intermediate expression form by making use of a classifier translation phrase 713 shown in FIG. 8 (step 590). When the lexical unit or token of concern is decided as representing a numerical value phrase (step 600), scale translation phrases 715 are retrieved in the direction from the lower-rank classifier to the higher-rank classifier to thereby search the relevant scale translation phrase (step 610), which is then followed by translation of the numerical value phrase into a relevant intermediate expression form by making use of the above scale translation phrase (step 620). On the other hand, when the lexical unit or token of concern represents an item value (step 630), item value translation phrases 716 are retrieved in the direction from the lower-rank classifier to the higher-rank classifier to thereby search the relevant one, whereupon the item value is translated into an intermediate expression form by using the relevant item value translation phrase 716 (step 650). In case the lexical token of concern does not match with any one of the phrases mentioned above, an error message is issued to the user in a step 660.

In translation of the display structure description 62 shown in FIG. 6 into an intermediate expression form, the classes of the phrases "[", "display-name", "DO12345", "[", category", "men's wear", "]", . . . resulting from the lexical analysis are discriminatively identified in accordance with the syntax rules 72. In this illustrative case, there make appearance "[", "display-name", "DO12345" and "[" in this sequence. Accordingly, in accordance with the display define statement rule 721, it is decided that <name>= [DO12345]. Further, because of such sequence that "men's wear" makes appearance in succession to "category" which is then followed by "]", it is decided on the basis of the rule for the category phrase 722 that <category name>="men's wear". In this manner, all the lexical units or tokens contained in the display structure description 62 are discriminatively identified in respect to the classes to which they belong. In succession, the lexical units or tokens are translated into corresponding intermediate expression forms in accordance with the translation rules 82 shown in FIG. 12. By way of example, lexical unit "category" belongs to a class <identifier>. Accordingly, the lexical token "category" is translated into the intermediate expression form "4" by referencing the translation rule 823 on the basis of the rule 723 for the identifier translation phrase. Furthermore, because the class of "men's wear" is <classifier>, the lexical unit or token "men's wear" is ultimately translated into the intermediate expression form "102" by referencing the translation rule 824 on the basis of the rule 724 for the classifier translation phrase.

As will be appreciated from the foregoing, the translation processing is performed by the service server 1 and the service client 2, in place of the translation rule managing server 3. By virtue of this arrangement, load for the translation processing can be distributed, whereby the translation processing speed can be enhanced significantly without need for increasing the number of the translation rule managing servers 3, to a great advantage. Furthermore, because the translation rule managing server 3 can be accessed as occasion requires, the translation rules for the service server 1 and the service client 2 can be updated timely with high efficiency, to another advantage. Besides, by exchanging the communication addresses of the translation rule managing servers 3, the user is capable of performing information transfers with various information expressing forms. Additionally, by providing in association with the communication network 4 an information processing apparatus destined for managing the communication addresses of the translation rule managing servers 3 in order to deal with the various information expressing forms, in addition to the service server 1, the service client 2 and the translation rule managing server 3, the user is required to be conscious of only one communication address, to a further advantage.

As is apparent from the foregoing description, by setting the classifier and the item name in the translation rules, ambiguousness which will otherwise be involved in the translation can be suppressed, whereby the expressions used ordinarily by the user can be translated correctly with high reliability. Further, owing to the hierarchical classification for defining relations among the low and high rank categories, (such as "wear" and "women's wear" "men's wear" and "children's wear"), the amount of description required for defining the translation rules can significantly be reduced. This is because when the translation rule can not be defined with category of low-rank, the translation rule defined for the high-rank category which is more generic can be made use of.

Embodiment 2

Next, description will be made of a service offering/ receiving system according to a second embodiment of the present invention in which the translation rule managing server is designed to perform the translation processing.

Figure 15:
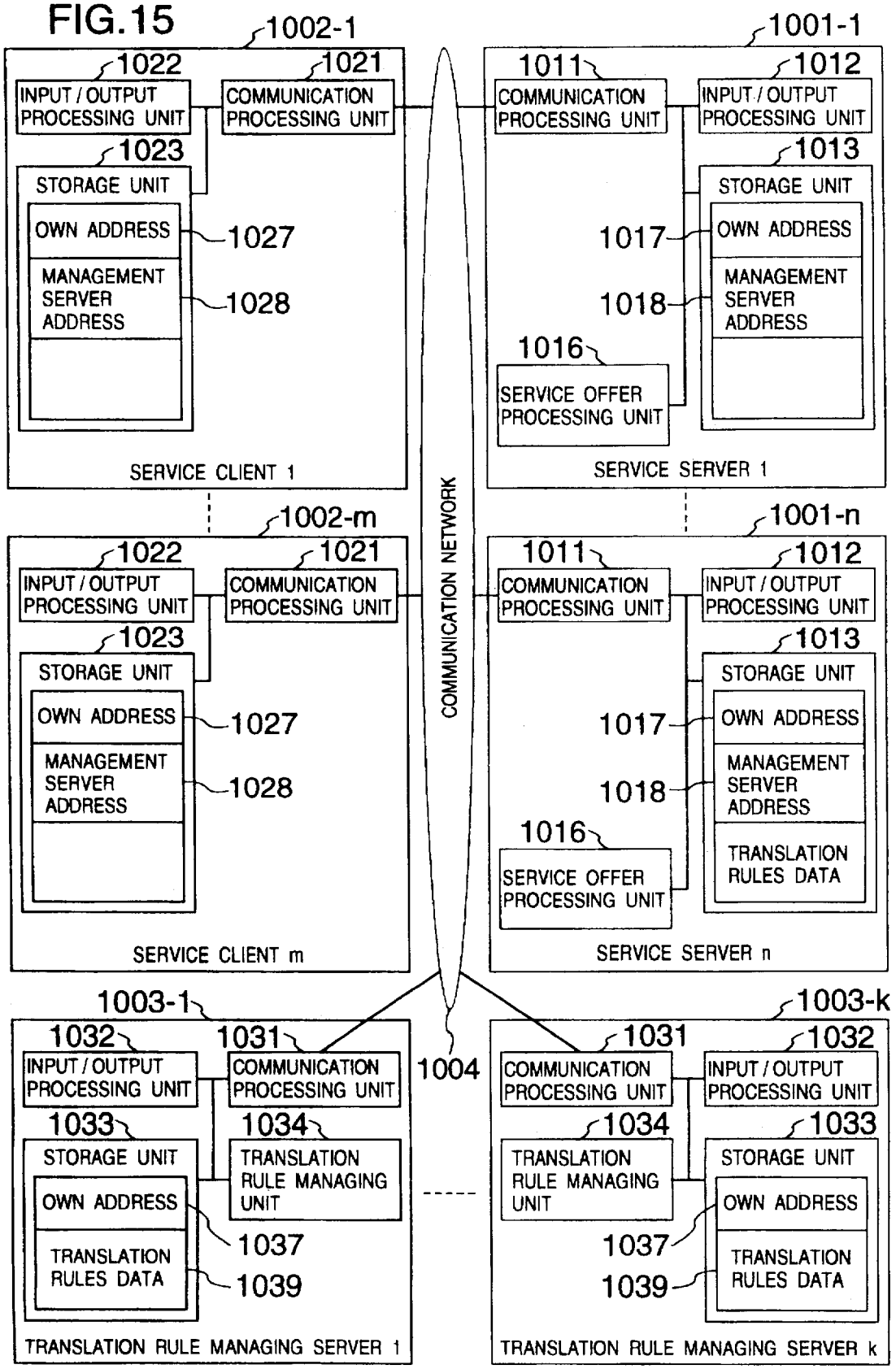
FIG. 15 is a schematic diagram showing in general an arrangement of a service offering/receiving system according to a second embodiment of the invention.

FIG. 15 is a schematic diagram showing in general an arrangement of the service offering/receiving system according to the instant embodiment of the invention. The service offering/receiving system now under consideration differs from the system shown in FIG. 1 in that the translation processing unit, the translation processing acquisition unit and the translation rule data storage are not incorporated in service clients 1002-1, . . . 1002-m or service servers 1001-1, . . . 1001-n and that translation rule management servers 1003-1, . . . 1003-k includes a translation processing unit 1034 (hereinafter, an arbitrary service client among the service clients 1002-1, . . . 1002-m is denoted as service client 1002; an arbitrary service server among the service servers 1001-1, . . . 1001-n is denoted as service server 1001; and an arbitrary translation rule management servers 1003-1, . . . 1003-k is denoted as translation rule management server 1003, in order to omit for the sake of simplicity). Except for these differences, the system shown in FIG. 15 is substantially same as that described hereinbefore by reference to FIG. 1.

When the service client 1002 calls the service server 1001, the service client 1002 sends to the service server 1001 a communication address of the translation rule management server 1003 which is in charge of translation to the information expressing form to be used by the service client 1002. In response, the service server 1001 sends to the translation rule management server 1003 designated by the communication address as received the service data for the translation together with the communication address of the service client 1002. On the other hand, in the translation rule management server 1003, a translation processing unit 1034 incorporated therein performs translation of the service data mentioned above and sends the translated service data to the received communication address of the service client 1002.

Owing to the teachings of the invention incarnated in the instant embodiment of the invention, the translation rule data as well as the translation processings can be concentrated to the translation rule management server 1003. Thus, upon maintenance of the translation processing unit and the translation rule data, the information processing apparatus for which the maintenance processing is to be performed can be limited to the translation rule management servers 1003. In general, the number of the translation rule management servers 1003 connected to the communication network 4 is smaller when compared with the number of the service servers 1001 a that of the service clients 1002. Consequently, the maintenance can be much facilitated because of capability of limiting the maintenance only to the translation rule management server 1003.

Embodiment 3

From a view point that a language used widely over the world is to be used as the intermediate expression form, it is contemplated with a third embodiment of the invention to use English for describing the intermediate expression form.

FIG. 16 is a view for illustrating translation rules 83 for Japanese words and English words used in the intermediate expression forms. Illustration in FIG. 16 is equivalent to that of FIG. 11 except that the numerical value expressions are replaced by English words in FIG. 16. In the case of the instant embodiment, the service data are transmitted through the communication network 4 in the form of the display structure description 62 described in English, as illustrated in FIG. 6. When the service is to be received in an English speaking bloc, the display data is structured straightforwardly with the data as received without need for translation from the intermediate expression form, to be subsequently displayed at the input/output processing unit 22. On the other hand, when service is to be employed in Japanese speaking bloc, the display structure description 62 illustrated in FIG. 6 is translated into the Japanese display structure description 61 shown in FIG. 5 in accordance with the translation rules 83 illustrated in FIG. 16, whereupon the display structure description 61 is displayed at the input/output processing unit 22 in Japanese.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, in the foregoing description of the embodiments of the invention, it has been presumed that one information expressing form is provided for one country, e.g. Japanese for the information processing apparatus in Japan, English for the information processing apparatus in U.S.A and so forth. However, the present invention is never restricted thereto. Apparently, one country may be divided into a plurality of regions or blocs in dependence on culture levels, wherein the information expressing forms may be provided in one-to-one correspondence to these blocs, respectively. Thus, the service offering/receiving system according to the invention can equally find practical application in multi-linguistic countries such as Switzerland, Canada and the like. Furthermore, although the newly created forms and English widely used over the world are adopted as the intermediate expression form, the present invention is never restricted thereto. The teachings of the invention can also be implemented by using given one of specific existing information expressing forms or languages such as Japanese, German, French or the like as the intermediate expression form, not to say of English.

Accordingly, all suitable modifications and equivalents may be resorted to, falling within the spirit and scope of the invention.

We claim:

1. A multi-language compatible service offering/receiving system comprising:

a first information processing apparatus for offering services;

a second information processing apparatus for receiving said services; and a third information processing apparatus for managing translation rules for translating information expressing forms, wherein said first, second and third information processing apparatuses are interconnected via a communication network, wherein said first information processing apparatus and said second information processing apparatus each comprises:

communication means for performing communication with the other information processing apparatus via said communication network, storage means for storing data, translation means for effecting translation of the information expressing forms in accordance with said translation rules, and translation rule acquiring means for acquiring said translation rules from said third information processing apparatus, wherein said third information processing apparatus comprises:

communication means for performing communication with said first and second information processing apparatuses via said communication network, storage means for storing said translation rules, and transfer means for transferring said translation rules in response to a request issued from said first or said second information processing apparatus, wherein said translation rules include a set of rules stipulating corresponding relationships between words of an intermediate expression having a meaning common to a plurality of languages and words of a specific language, and a set of rules stipulating corresponding relationships between scale units of said intermediate expression and scale units translated into values accompanied by specific scale units, serving as standards for units such as length, weight, or currency and specific scale units, and wherein, when sending out said data onto said communication network, said translating means translates words of a specific language contained in said data into words of said intermediate expression and translates the values accompanied by the specific scale units into the scale units of said intermediate expression by making use of said translation rules, while upon reception of the data from said communication network, said translating means translates the words of the intermediate expression contained in said data as received into the words of the specific language and translates the scale units of said intermediate expression into values accompanied by the specific scale units.

2. A multi-language compatible service offering/receiving system according to claim 1, wherein upon reception of data by said first or second information processing apparatus from said communication network, said translation rule acquiring means acquires translation rule relevant to said data from said third information processing apparatus when rules relevant to common words or common sentence structuring rule or rules for common scale are not stored in said storage means.

3. A multi-language compatible service offering/receiving system according to claim 1, wherein said third information processing apparatus is provided for each of the languages or for each of the scale units, and wherein each of said first and second information processing apparatuses includes:

means for selecting information expressing form discretely for said languages or for said the scale units, respectively, means for storing communication addresses of said third information processing apparatuses discretely for said languages or said scale units, respectively; and means for acquiring the communication addresses for said third information processing apparatuses on the basis of classes of said data to be translated when the translation rule relevant to said data to be translated is unavailable.

4. A multi-language compatible service offering/receiving system according to claim 1, wherein an information processing apparatus for managing correspondence relations between communication addresses of said third information processing apparatus and classes of the data to be translated is connected to said communication network.

5. A multi-language compatible service offering/receiving system according to claim 1, wherein at least one of said translation rules includes as attributes thereof a classifier representing a name which conceptually encompasses words to undergo said translation and an item name, and wherein said translating means performs translation of said information expressing forms by limiting the words to be translated to words of conceptually lower rank encompassed by said classifier and said item name as designated.

6. A multi-language compatible service offering/receiving system comprising:

a plurality of first information processing apparatuses for offering services;

a plurality of a second information processing apparatus for receiving said services; and at least one third information processing apparatus for managing translation rules for translating information expressing forms such as languages and scale units, wherein said first, second and third information processing apparatuses are interconnected via a communication network, wherein said first information processing apparatus and said second information processing apparatus each comprises:

at least communication means for performing communication with the other information processing apparatus via said communication network, input/output means for inputting/outputting data, and storage means for storing data;

wherein said third information processing apparatus comprises at least:

communication means for performing communication with other processing apparatuses via said communication network, storage means for storing said translation rules, and translation means for performing translation of the information expressing forms in accordance with said translation rules, wherein said translation rules include a set of rules stipulating corresponding relationships between words of an intermediate expression having a meaning common to a plurality of languages and words of a specific language, and by a set of rules stipulating corresponding relationships between scale units of said intermediate expression and scale units translated into values accompanied by specific scale units serving as standards for units such as length, weight, or currency and specific scale units, and wherein, upon reception of words of specific language or specific scale units from said communication network, said translating means translates words of the values accompanied by said specific language into words of said intermediate expression while translating said specific scale units into scale units of said intermediate expression by making use of said translation rules, while upon reception of the words of said intermediate expression of the scale units of said intermediate expression from said communication network, said translating means translates the words of said intermediate expression into the words of the specific language and translates the scale units of said intermediate expression into values accompanied by said specific scale units.

7. A multi-language compatible service offering/receiving system according to claim 6, wherein said third information processing apparatus is provided for each of the languages or for each of the scale units, respectively;

and wherein each of said first information processing apparatus and said second information processing apparatuses includes:

means for selecting information expressing forms discretely for said languages or for said the scale units, respectively;

means for storing communication addresses of said third information processing apparatuses discretely for said languages or said scale units, respectively; and means for acquiring the communication addresses for said third information processing apparatuses on the basis of the classes of the data being attempted for translation unless the translation rule relevant to said data is available.

8. A multi-language compatible service offering/receiving system according to claim 6, wherein an information processing apparatus for managing communication addresses of said third information processing apparatus is connected to said communication network.

9. A multi-language compatible service offering/receiving system according to claim 6, wherein said translation rule have a classifier representing a name which conceptually encompasses words to undergo said translation and an item name as attributes, and wherein said translating means performs translation of said information expressing forms by limiting the words to undergo the translation to words of conceptually lower rank encompassed by said classifier and said item name as designated.

10. In an information processing apparatus connected to a network and including a display device, a method of displaying data, comprising the steps of:

responding to reception of data via said network to make decision as to whether data given in an intermediate expression common to information processing apparatuses connected to said network is contained in the received data, said data given in said intermediate expression is included in a translation rule table containing a set of rules stipulating corresponding relationships between intermediate expression scale units and scale units translated into values accompanied by specific scale units, serving as standards for units such as length, weight, or currency; and displaying data of specific expression when contained in said received data after having translated said common intermediate expression into the specific expression preset inherently to said information processing apparatus, the specific expression being translated from scale unit of intermediate expression contained in the received data.

11. A data displaying method according to claim 10, wherein said information processing apparatus is provided with a translation rule table containing correspondence relations for translation of said intermediate expression into said specific expression, comprising the step of;

translating said intermediate expression into said specific expression by referencing said translation rule table.

12. A data displaying method according to claim 11, wherein said translation rule table contains a set of rules stipulating correspondence relations between words of an intermediate expression each having a meaning common to a plurality of languages and words of a specific language, and wherein in said displaying step, the word of said specific language resulting from translation of the word of said intermediate expression contained in said received data is displayed.

13. The system recited in claim 1, further comprising a unit which permits a user to gain access to the rules.

14. A data displaying method according to claim 11, wherein upon reception of data containing data given in said intermediate expression from said network, said information processing apparatus sends out a request for acquisition of relevant translation rule table to other information processing apparatus via said network, unless the translation rule table pertinent to said data of intermediate expression as received is available in the first mentioned information processing apparatus.

15. In an information processing apparatus connected to a network and including a storage unit for storing information to be sent via said network, a method of sending data, comprising the steps of:

making decision as to whether data of a specific expression is contained in data held by said information processing apparatus upon sending of said data onto said network;

translating said data of specific expression as contained in the data held by said information processing apparatus into data of an intermediate expression common to information processing apparatuses provided on said network, said data of said intermediate expression is included in a translation rule table containing a set of rules stipulating corresponding relationships between intermediate expression scale units and scale units translated into values accompanied by specific scale units, serving as standards for units such as length, weight, or currency; and sending data containing the translated data onto said network, the translated data being the scale unit of said intermediate expression translated from said specific scale unit.

16. A data sending method according to claim 15, wherein said information processing apparatus is provided with a translation rule table containing correspondence relation for translation of said specific expression into said intermediate expression, comprising the step of:

translating said intermediate expression into said specific expression by referencing said translation rule table.

17. A data sending method according to claim 16, wherein said translation rule table contains a set of rules stipulating correspondence relations between words of said intermediate expression each having a meaning common to a plurality of languages and words of a specific language, and wherein in said translating step, the word of said specific language contained in said data to be sent out is translated into word of said intermediate language.

18. The system recited in claim 6, further comprising a unit which permits a user to gain access to the rules.

19. A data sending method according to claim 16, wherein upon sending of data containing data given in said specific expression onto said network, said information processing apparatus sends out a request for acquisition of relevant translation rule table to other information processing apparatus via said network, unless the translation rule table pertinent to said data of the specific expression is available in the said information processing apparatus.

20. In an information processing apparatus connected to a network for transferring data sent out from a first information processing apparatus to a second information processing apparatus, a method of transferring data, comprising the steps of:

determining a communication address of said second destination information processing apparatus added to data sent from said first information processing apparatus, making decision as to whether data of a specific expression is contained in the data to be transferred, translating data of said specific expression as contained in said data to be transferred into specific expression pertinent to said second information processing apparatus;

transferring data containing the translated data to said second information processing apparatus.

21. The method recited in claim 15, wherein said translation rule table is updated periodically with information which includes at least one of new translation rules and modifications of existing translation rules.

* * * * *